(12) United States Patent
Nakano et al.

(10) Patent No.: US 12,429,856 B2
(45) Date of Patent: Sep. 30, 2025

(54) FACTORY PLAN DEVICE, FACTORY PLAN SYSTEM, AND FACTORY PLAN METHOD

(71) Applicant: Hitachi, Ltd., Tokyo (JP)

(72) Inventors: Takahiro Nakano, Tokyo (JP); Atsuko Enomoto, Tokyo (JP); Daiki Kajita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 388 days.

(21) Appl. No.: 18/009,379

(22) PCT Filed: May 10, 2021

(86) PCT No.: PCT/JP2021/017734
§ 371 (c)(1),
(2) Date: Dec. 9, 2022

(87) PCT Pub. No.: WO2022/044437
PCT Pub. Date: Mar. 3, 2022

(65) Prior Publication Data
US 2023/0221706 A1    Jul. 13, 2023

(30) Foreign Application Priority Data
Aug. 28, 2020 (JP) .................................. 2020-144537

(51) Int. Cl.
G05B 19/418    (2006.01)

(52) U.S. Cl.
CPC ... G05B 19/41865 (2013.01); G05B 19/4185 (2013.01)

(58) Field of Classification Search
CPC .......... G05B 19/41865; G05B 19/4185; G05B 2219/32085; G05B 19/4188; Y02P 90/02; Y02P 90/30; G06Q 10/06; G06Q 50/04
See application file for complete search history.

(56) References Cited

U.S. PATENT DOCUMENTS

2005/0278161 A1* 12/2005 Sung ..................... G06Q 10/06
                                                         703/22
2008/0263491 A1* 10/2008 Foltz ..................... G06Q 10/06
                                                         716/118
(Continued)

FOREIGN PATENT DOCUMENTS

JP    10-225724 A    8/1998
JP    10-240806 A    9/1998
(Continued)

OTHER PUBLICATIONS

Zhang, Zhinan, et al. "A simulation-based approach for plant layout design and production planning." Journal of Ambient Intelligence and Humanized Computing 10.3 (2019): 1217-1230. (Year: 2019).*

(Continued)

*Primary Examiner* — Christopher E. Everett
(74) *Attorney, Agent, or Firm* — Crowell & Moring LLP

(57) ABSTRACT

It is possible to more efficiently make a factory plan configured to maximize a productivity index.
Provided is a factory plan device including a calculation unit configured to specify a process and a production resource candidate based on a shape of a component of a target product by inputting past production performance data of a product, production volume data, design data of the product, specification data of a production resource, and layout data of a factory, and to calculate a process plan configured to determine order of the process and the production resource, a production plan configured to determine working date and time of the production resource, and a layout of the production resource so as to maximize a predetermined productivity index in the factory.

12 Claims, 21 Drawing Sheets

(56) References Cited

U.S. PATENT DOCUMENTS

| | | | | |
|---|---|---|---|---|
| 2012/0041798 A1* | 2/2012 | Prescher | ............ | G06Q 10/0633 |
| | | | | 705/7.27 |
| 2020/0209817 A1* | 7/2020 | Lee | ......................... | H04L 67/12 |
| 2022/0121181 A1* | 4/2022 | Sobalvarro | ........ | G05B 19/4188 |

FOREIGN PATENT DOCUMENTS

| | | |
|---|---|---|
| JP | 2003-44115 A | 2/2003 |
| JP | 2003-162313 A | 6/2003 |
| JP | 2011-150571 A | 8/2011 |

OTHER PUBLICATIONS

Centobelli, Piera, et al. "Layout and material flow optimization in digital factory." International journal of simulation modelling 15.2 (2016): 223-235. (Year: 2016).*

International Search Report (PCT/ISA/210) issued in PCT Application No. PCT/JP2021/017734 dated Jul. 13, 2021 with English translation (four (4) pages).

Japanese-language Written Opinion (PCT/ISA/237) issued in PCT Application No. PCT/JP2021/017734 dated Jul. 13, 2021 (three (3) pages).

Japanese-language Office Action issued in Japanese Application No. 2020-144537 dated Jan. 16, 2024 with English translation (8 pages).

* cited by examiner

[FIG. 1]
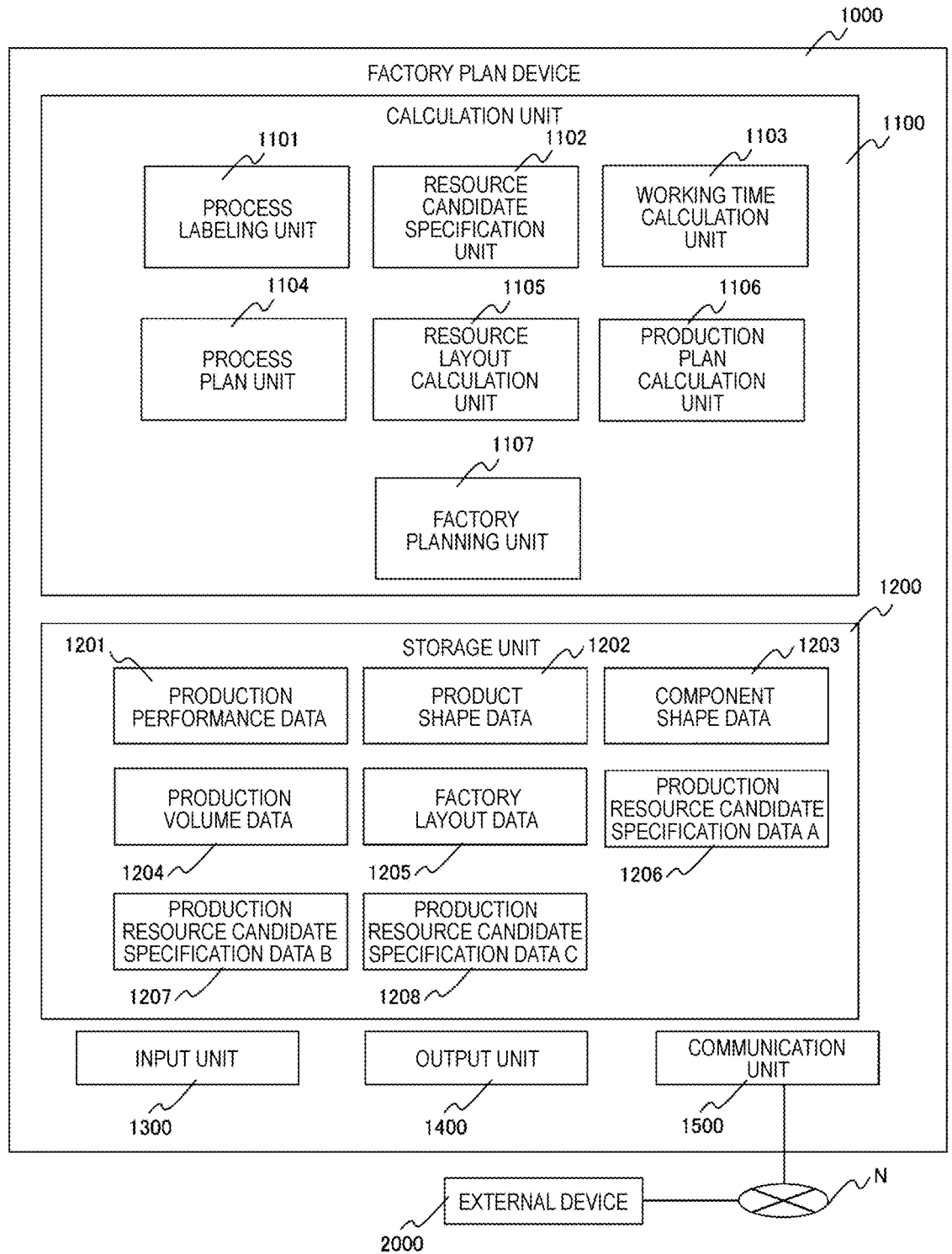

[FIG. 2]

PRODUCTION PERFORMANCE DATA 1201

| PRODUCT ID | COMPONENT ID | PROCESS ID | PRODUCTION RESOURCE ID | DATE AND TIME | START TIME | END TIME |
|---|---|---|---|---|---|---|
| 08AA C01 | 08AA C01-10B | 13 | 402 | 2020/3/20 | 5:30 | 6:10 |
| 08AB A03 | 08AA C01-30A | 4 | 201 | 2020/3/20 | 5:40 | 5:50 |
| 08AB C01 | 08AB C01-01C | 3 | 180 | 2020/3/20 | 5:40 | 6:00 |
| 08AB A03 | 08AB A03-34B | 5 | 160 | 2020/3/20 | 5:50 | 6:20 |
| 08AB A05 | 08AB A05-41C | 5 | 161 | 2020/3/20 | 5:50 | 6:20 |

⋮

[FIG. 3]
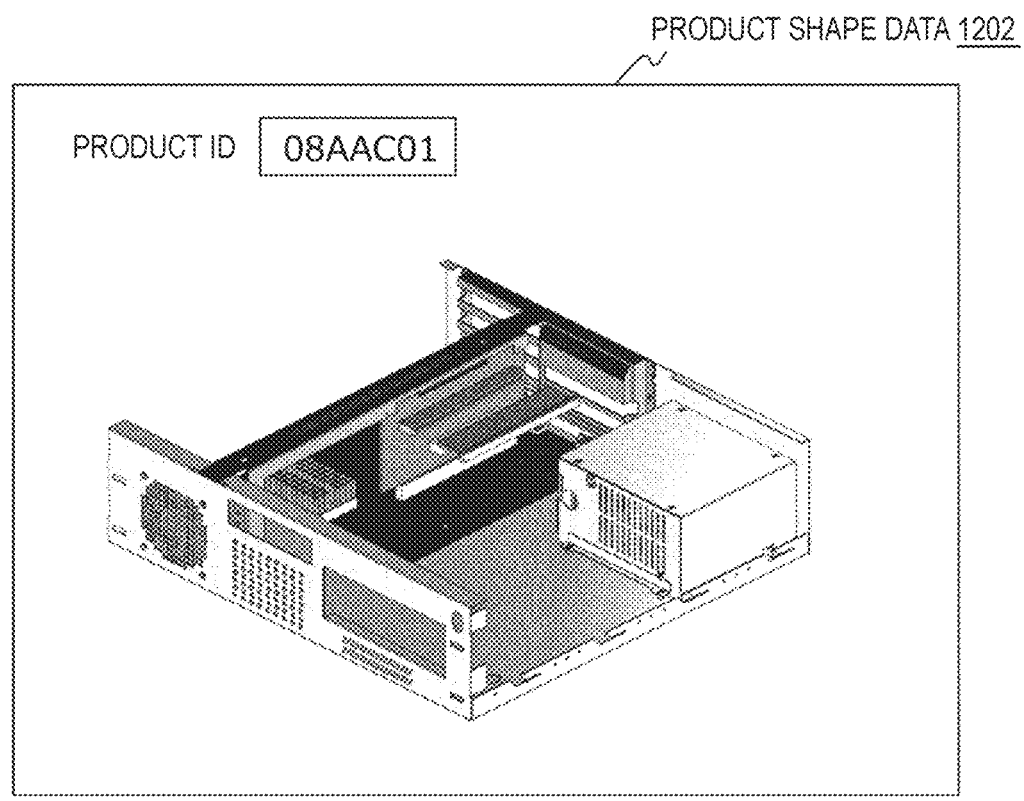

[FIG. 4]

COMPONENT SHAPE DATA 1203

| COMPONENT ID | COMPONENT NAME | SHAPE CHARACTERISTICS | WIDTH (mm) | LENGTH (mm) | DIAMETER (mm) | WEIGHT (kg) |
|---|---|---|---|---|---|---|
| 08AAC01-10B | * * * * * | CYLINDRICAL SHAPE | * * | * * | * * | * * |
| 08AAC01-30A | * * * * * | RECTANGULAR SHAPE | * * | * * | * * | * * |
| 08ABC01-01C | * * * * * | COLUMNAR SHAPE | * * | * * | * * | * * |

PRODUCTION VOLUME DATA 1204

| PRODUCT ID | MONTHLY PRODUCTION VOLUME | | | | | | |
|---|---|---|---|---|---|---|---|
| | YEAR 2020 | | | | | | |
| | APRIL | MAY | JUNE | JULY | AUGUST | SEPTEMBER | OCTOBER |
| 08AAC01 | 8 | 5 | 13 | 55 | 12 | 20 | 10 |
| 08AAC02 | 5 | 10 | 14 | 10 | 11 | 30 | 14 |
| 08AAC03 | 10 | 11 | 16 | 20 | 23 | 10 | 15 |

1204a (Product ID column), 1204b (Monthly Production Volume columns)

[FIG. 6]
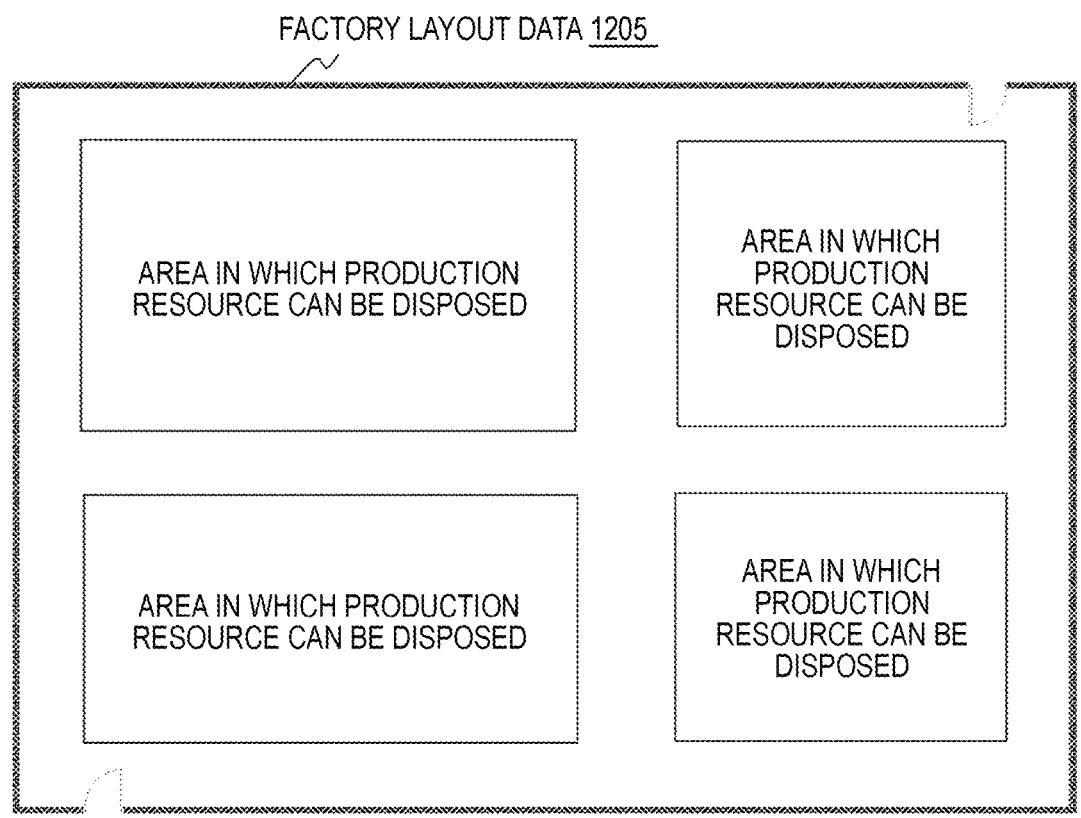

[FIG. 7]

PRODUCTION RESOURCE
CANDIDATE SPECIFICATION DATA A 1206

| PRODUCTION RESOURCE TYPE ID | PRODUCTION RESOURCE TYPE NAME |
|---|---|
| 01 | INDUSTRIAL ROBOT |
| 02 | PROCESSING MACHINE |
| 03 | WORKER |

PRODUCTION RESOURCE CANDIDATE SPECIFICATION DATA B 1207

| PRODUCTION RESOURCE TYPE ID | PRODUCTION RESOURCE ID | NUMBER OF AXES | WEIGHT (kg) | ACCURACY (mm) | WEIGHT CAPACITY (kg) | ARM LENGTH (mm) | SPEED (mm/sec) | |
|---|---|---|---|---|---|---|---|---|
| 1207a | 1207b | 1207c | 1207d | 1207e | 1207f | 1207g | 1207h | |
| 01 | 0101 | 5 | 15 | ±0.03 | 3.0 | 400 | 5.000 | ... |
| 01 | 0102 | 4 | 30 | ±0.01 | 5.0 | 300 | 6.000 | |

⋮

[FIG. 9]
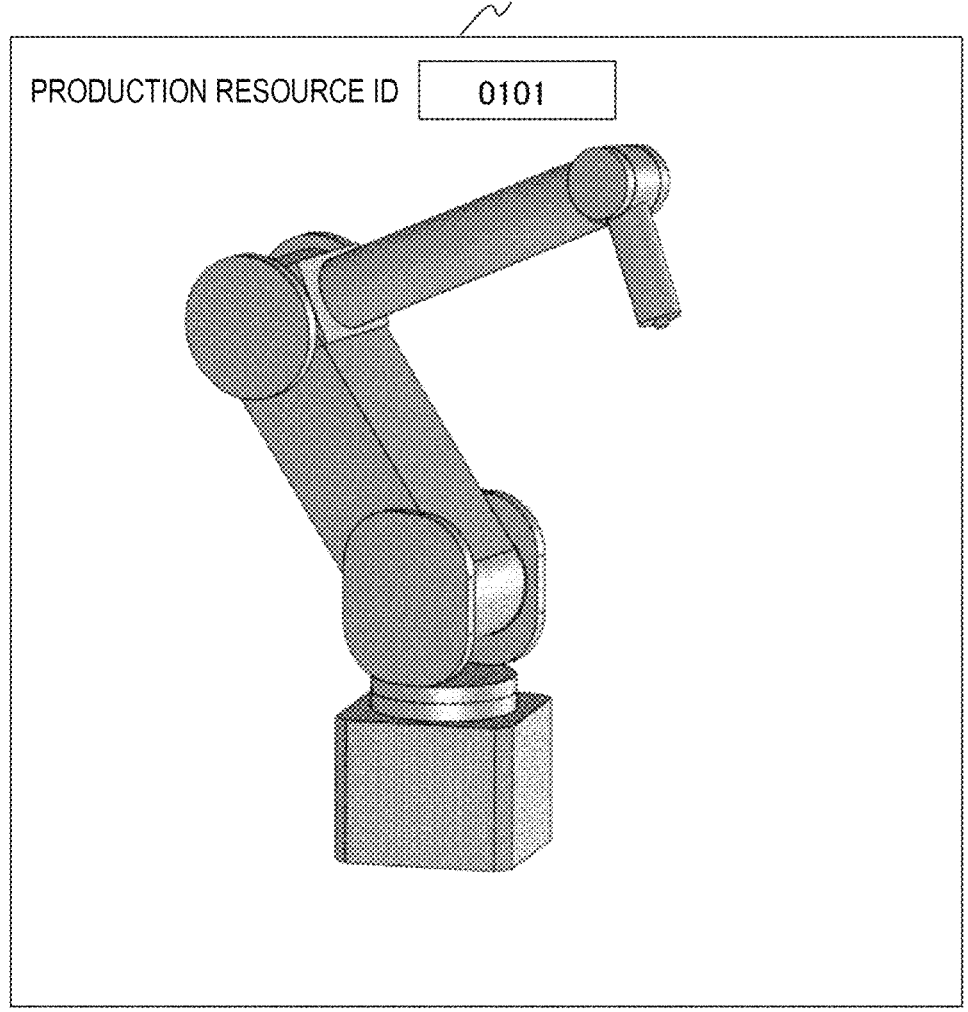

[FIG. 10]
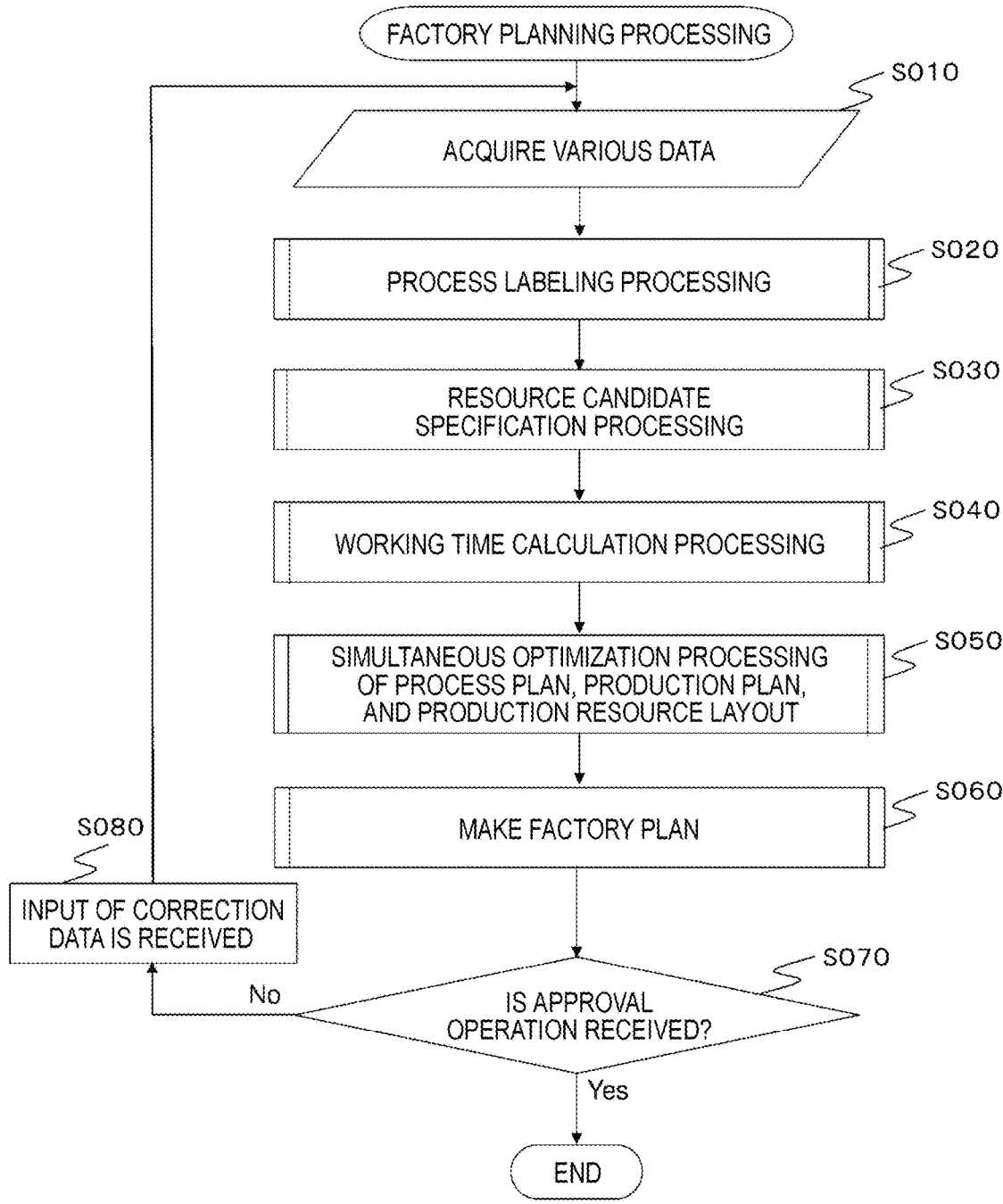

[FIG. 11]
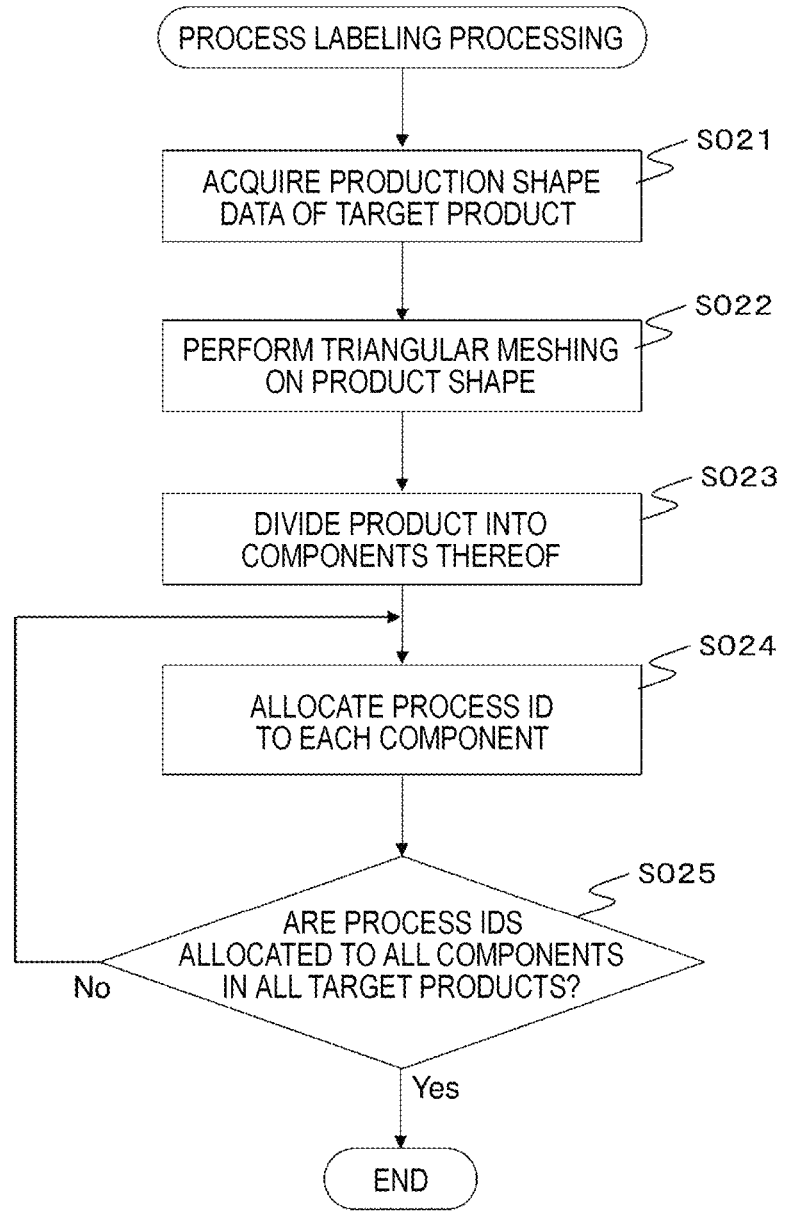

[FIG. 12]
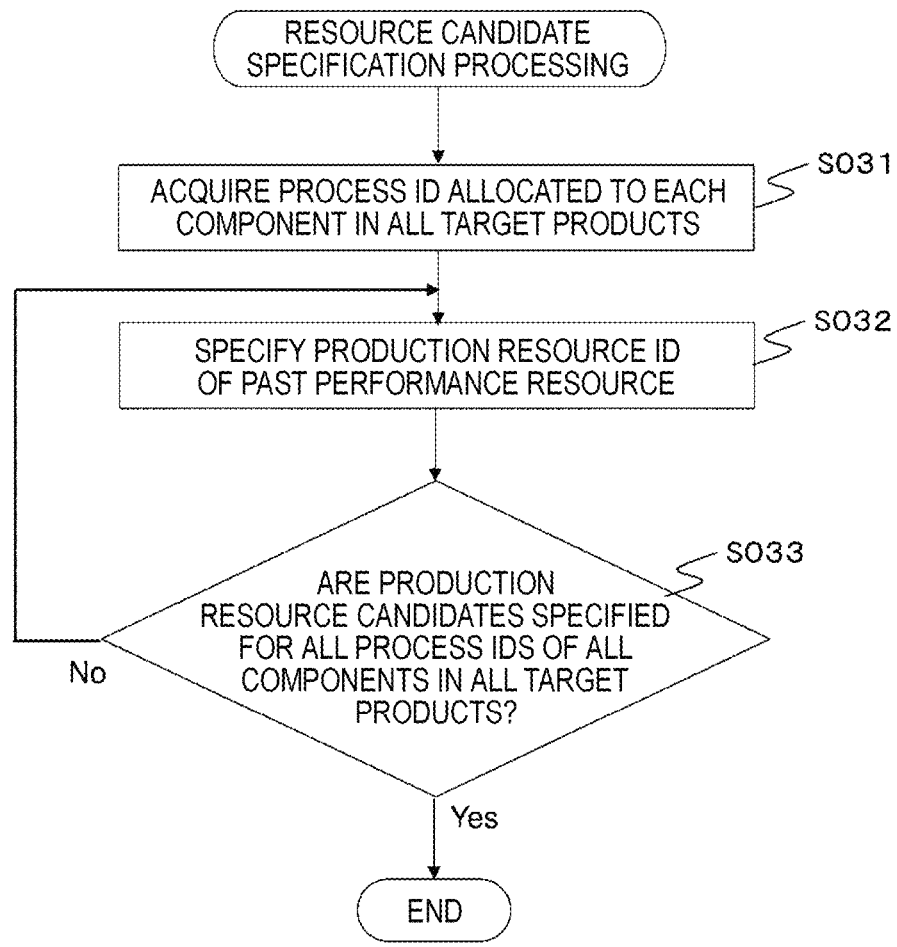

[FIG. 13]
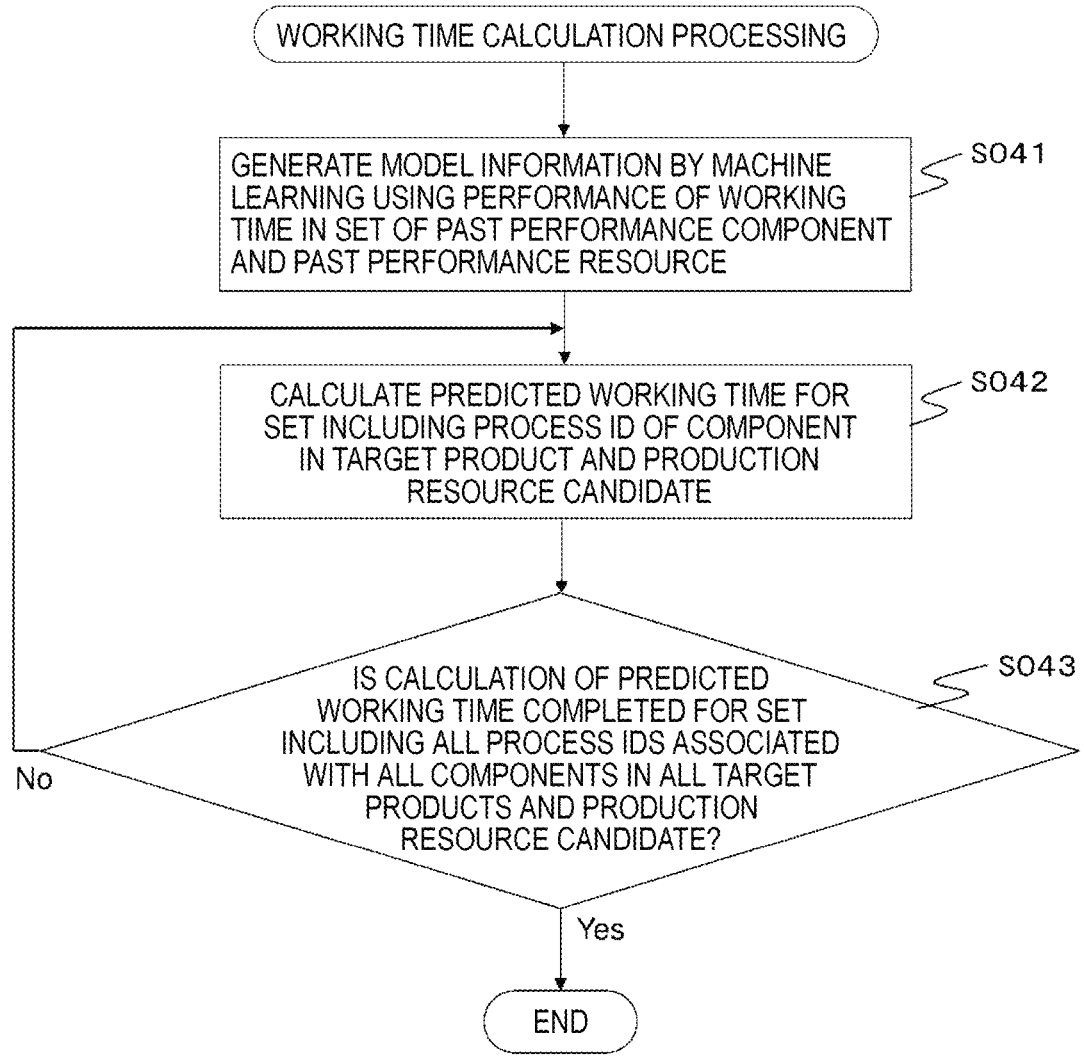

[FIG. 14]
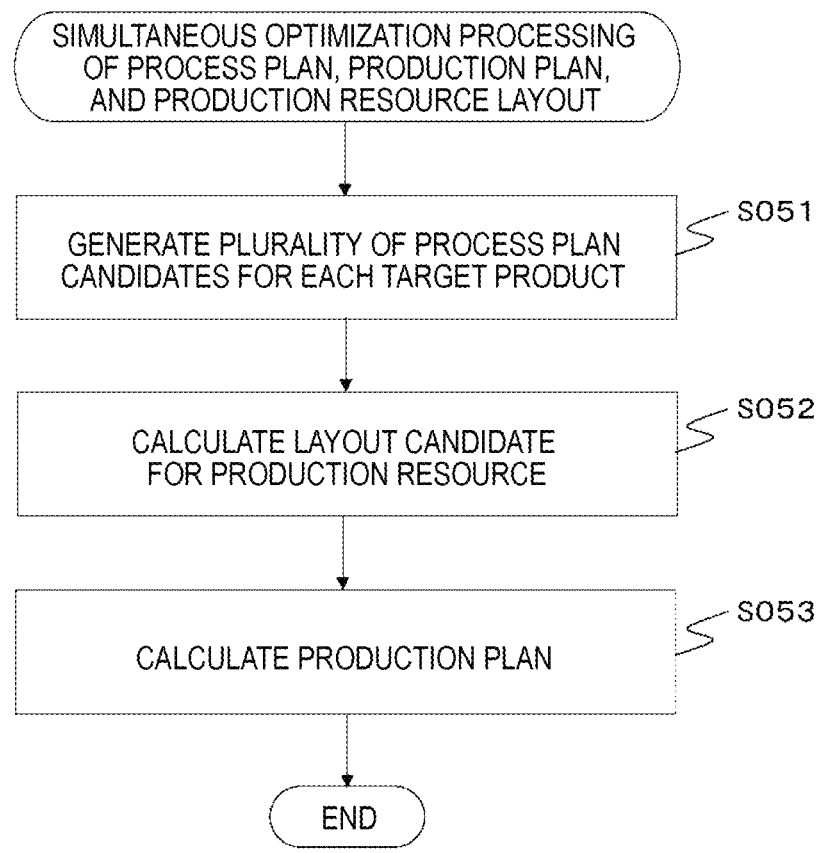

[FIG. 15]

PROCESS PLAN DATA 1209

| PRODUCT ID | PROCESS ID | PRODUCTION RESOURCE ID | |
|---|---|---|---|
| 08ABB011 | 6 | 0106 | |
| 08ABB011 | 10 | 0110 | ... |
| 08ABB011 | 11 | 0600 | |
| 08ABB011 | 15 | 0601 | |
| 08ABB011 | 15 | 0130 | |
| 08ABB011 | 20 | 0802 | | columns: 1209a, 1209b, 1209c

[FIG. 16]

PRODUCTION PLAN DATA 1210

| PRODUCT ID | COMPONENT ID | PROCESS ID | PRODUCTION RESOURCE ID | DATE AND TIME | SCHEDULED START TIME | SCHEDULED END TIME |
|---|---|---|---|---|---|---|
| 08AAB03 | 08AAB03-14B | 6 | 0153 | 2020/6/15 | 10:20 | 10:30 |
| 08AAC01 | 08AAC01-03A | 3 | 0340 | 2020/6/15 | 10:40 | 11:00 |
| 08AAA010 | 08AAA010-31D | 1 | 0140 | 2020/6/15 | 10:53 | 11:10 |
| 08AAB01 | 08AAB01-41B | 15 | 0150 | 2020/6/15 | 11:00 | 11:40 |
| 08ABA10 | 08ABA10-11A | 11 | 0220 | 2020/6/15 | 11:10 | 12:00 |

Columns: 1210a, 1210b, 1210c, 1210d, 1210e, 1210f, 1210g

[FIG. 17]
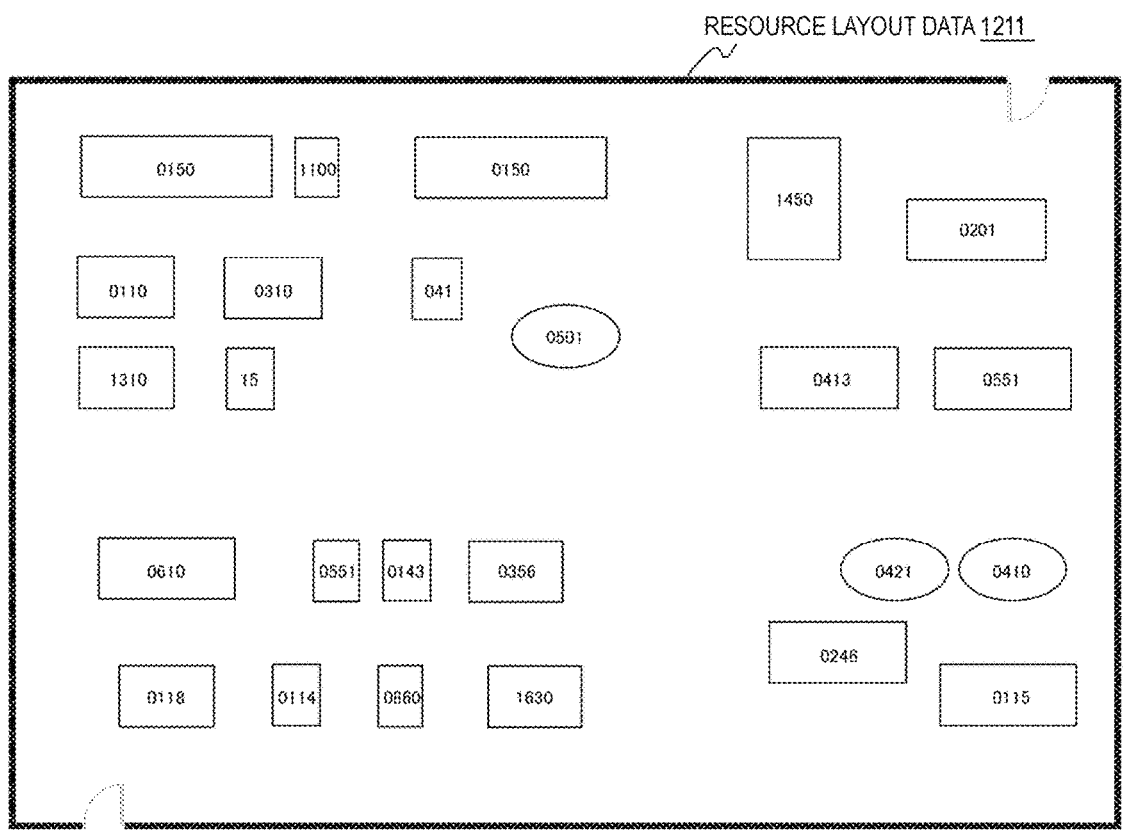

[FIG. 18]
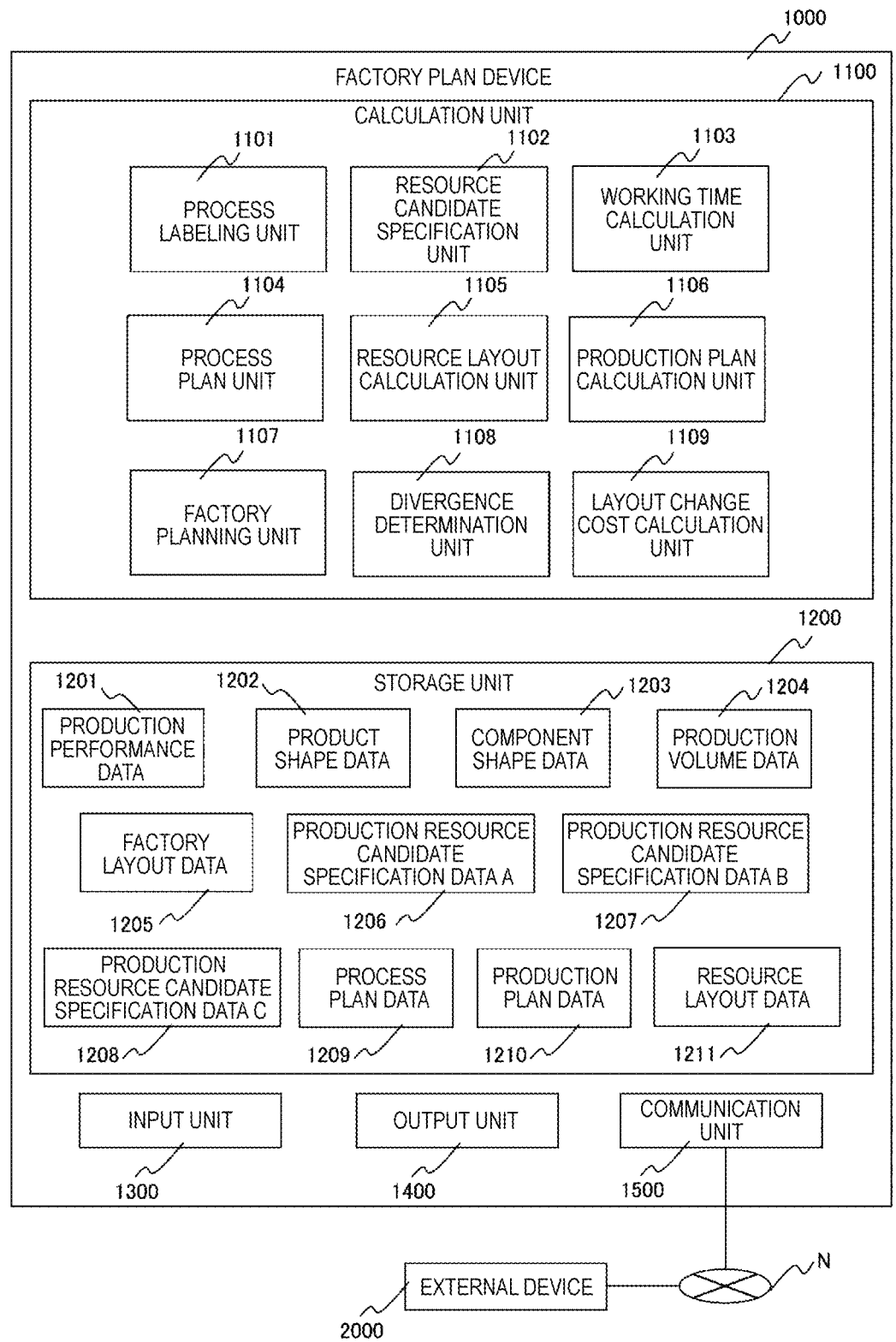

[FIG. 19]
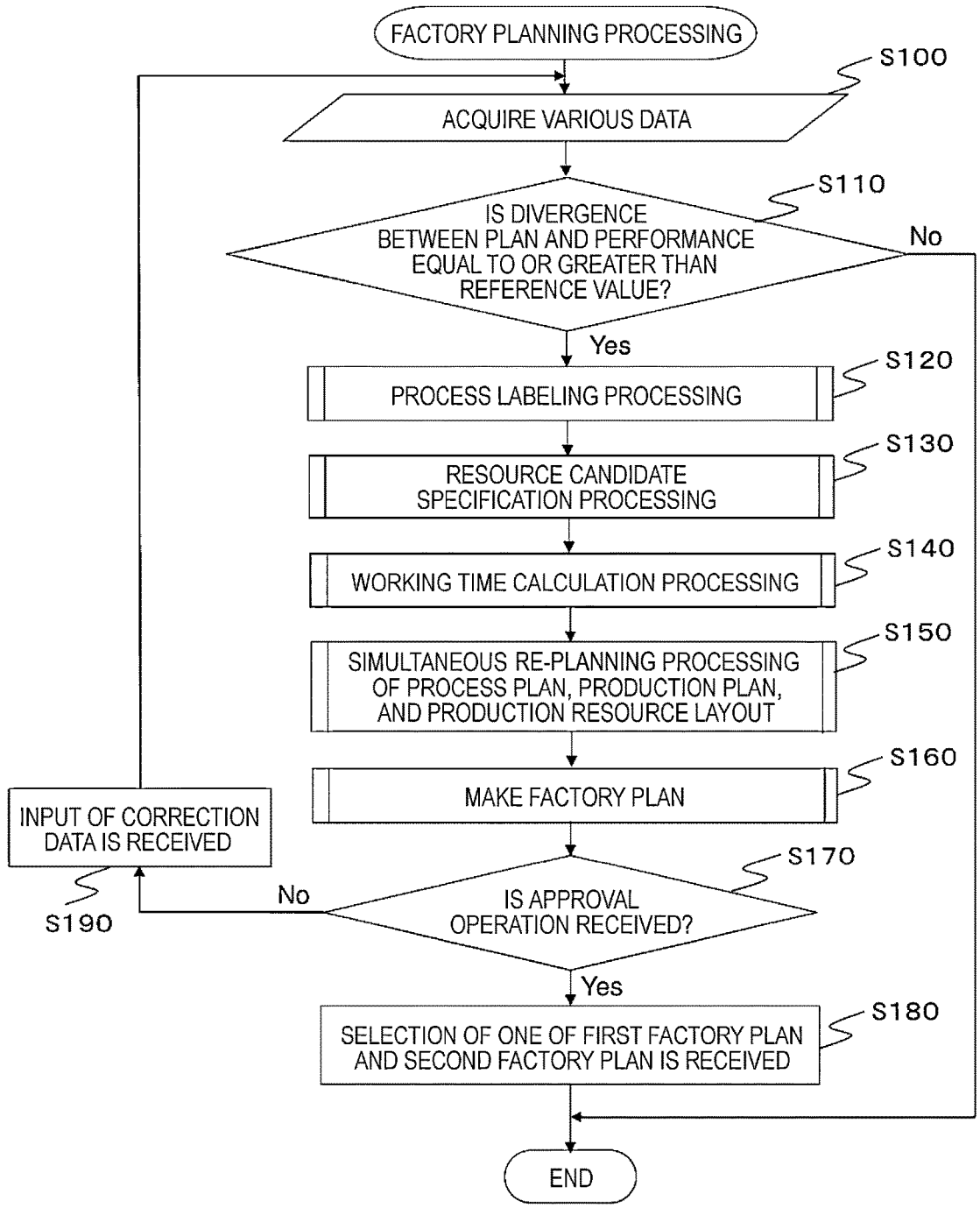

[FIG. 20]
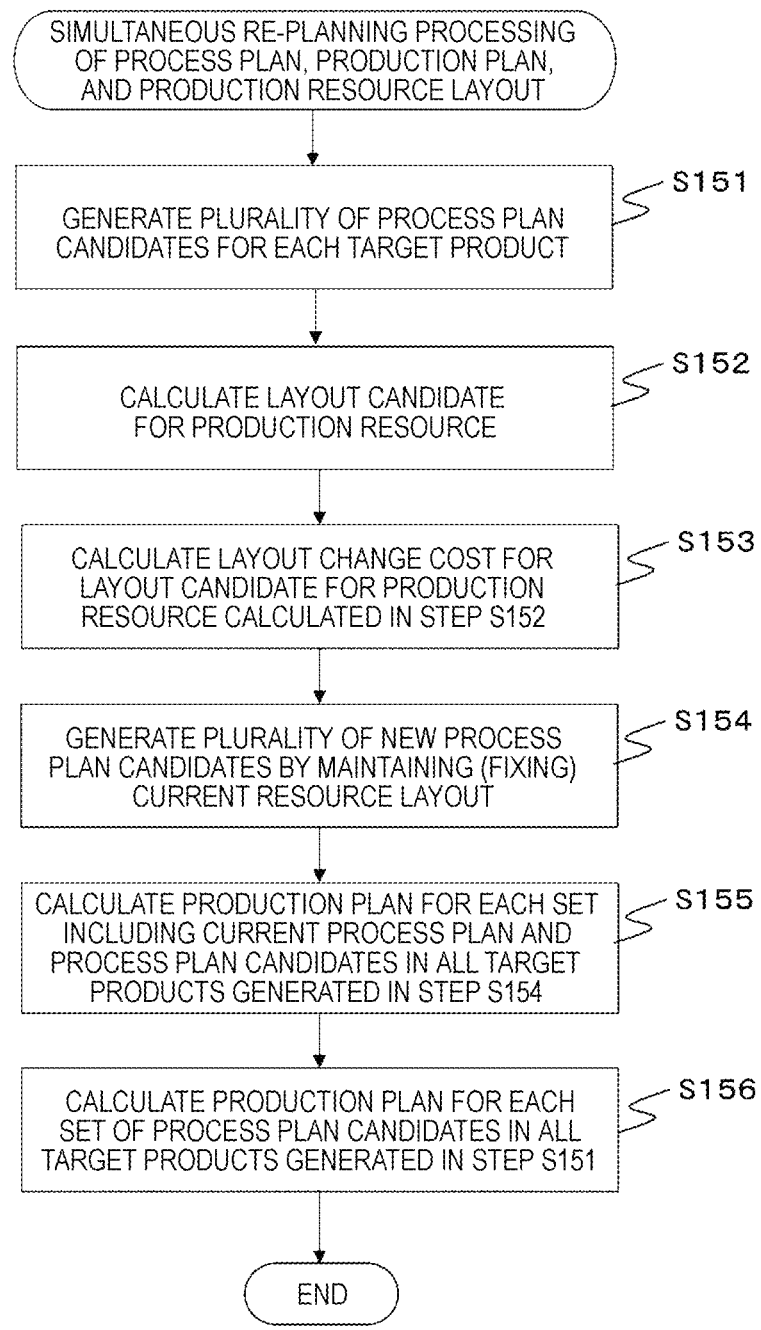

[FIG. 21]
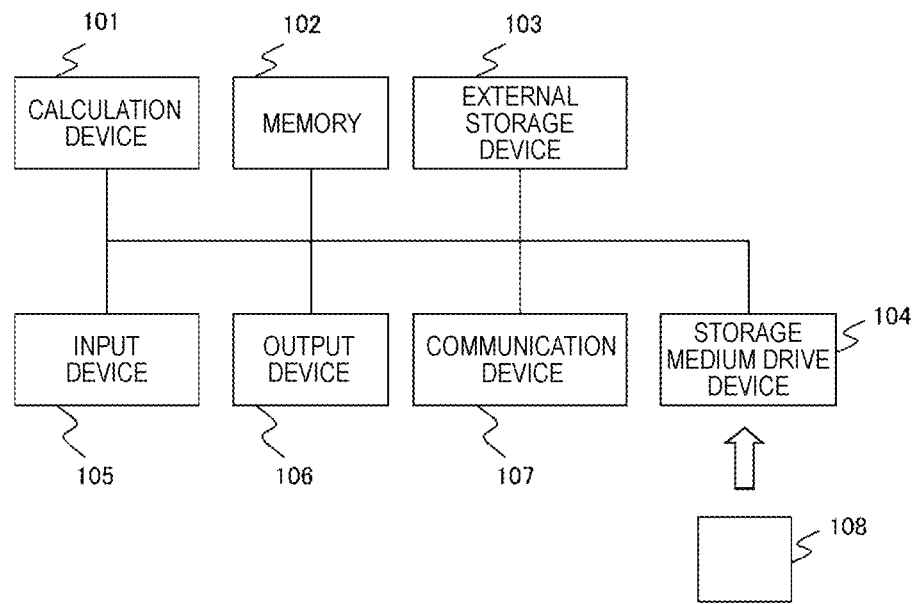

FACTORY PLAN DEVICE, FACTORY PLAN SYSTEM, AND FACTORY PLAN METHOD

TECHNICAL FIELD

The present invention relates to a factory plan device, a factory plan system, and a factory plan method. The present invention is based upon and claims the benefit of priority from Japanese Patent Application No. 2020-144537, filed on Aug. 28, 2020, the entire contents of which are incorporated herein by reference with respect to designated countries where incorporation by reference of documents is permitted.

BACKGROUND ART

JP-A-2003-44115 (PTL 1) relates to a method of designing a manufacturing line, the method including "transferring each information between a process design, a layout design, and a production capacity design through a product and manufacturing database; generating a process flow based on at least a shape of the product and component configuration information of the product; laying out manufacturing resources based on the process flow, manufacturing resource information including at least equipment and a worker required to manufacture the product, and constraints of a location at which the product is manufactured; generating a manufacturing line virtual model based on a result of the layout design and the manufacturing resource information; reproducing movement of the manufacturing line by using the manufacturing line virtual model; and obtaining production capacity of the manufacturing line".

CITATION LIST

Patent Literature

PTL 1: JP-A-2003-44115

SUMMARY OF INVENTION

Technical Problem

A technique disclosed in PTL 1 generates a process flow based on a product shape and component configuration information, and lays out production resources, thereby obtaining a production capacity of a manufacturing line. That is, the technique disclosed in PTL 1 generates an equipment layout after process information is generated. However, flow line efficiency of a product in the equipment layout is changed depending on a process order, and operation efficiency of equipment is changed depending on a process order, allocation of production resources in a process, and a production plan. Therefore, in order to design a manufacturing line configured to maximize a productivity index such as equipment operation efficiency, production throughput, and an on-time delivery rate using the technique disclosed in PTL 1, it is necessary to perform an enormous number of combinations, which causes a problem in that the number of man-hours required to generate a plan becomes enormous.

The present invention has been made in view of the above-described problems, and it is an object of the present invention to more efficiently make a factory plan configured to maximize a productivity index.

Solution to Problem

The present application includes a plurality of means configured to solve at least a part of the above-described problems, and examples thereof are described as follows. According to one aspect of the present invention, a factory plan device configured to solve the problems includes a calculation unit configured to specify a process and a production resource candidate based on a shape of a component of a target product by inputting past production performance data of a product, production volume data, design data of the product, specification data of a production resource, and layout data of a factory, and to calculate a process plan configured to determine order of the process and the production resource, a production plan configured to determine working date and time of the production resource, and a layout of the production resource so as to maximize a predetermined productivity index in the factory.

Advantageous Effects of Invention

According to the present invention, it is possible to more efficiently make a factory plan configured to maximize a productivity index.

BRIEF DESCRIPTION OF DRAWINGS

FIG. 1 is a diagram showing an example of a schematic configuration of a factory plan system according to a first embodiment.

FIG. 2 is a diagram showing an example of production performance data.

FIG. 3 is a diagram showing an example of product shape data.

FIG. 4 is a diagram showing an example of component shape data.

FIG. 5 is a diagram showing an example of production volume data.

FIG. 6 is a diagram showing an example of factory layout data.

FIG. 7 is a diagram showing an example of production resource candidate specification data A.

FIG. 8 is a diagram showing an example of production resource candidate specification data B.

FIG. 9 is a diagram showing an example of production resource candidate specification data C.

FIG. 10 is a flowchart showing an example of factory planning processing according to the first embodiment.

FIG. 11 is a flowchart showing an example of process labeling processing.

FIG. 12 is a flowchart showing an example of resource candidate specification processing.

FIG. 13 is a flowchart showing an example of working time calculation processing.

FIG. 14 is a flowchart showing an example of simultaneous optimization processing.

FIG. 15 is a diagram showing an example of process plan data.

FIG. 16 is a diagram showing an example of production plan data.

FIG. 17 is a diagram showing an example of resource layout data.

FIG. 18 is a diagram showing an example of a schematic configuration of a factory plan device according to a second embodiment.

FIG. 19 is a flowchart showing an example of factory planning processing according to the second embodiment.

FIG. 20 is a flowchart showing an example of simultaneous re-planning processing.

FIG. 21 is a diagram showing an example of a hardware configuration of a computer configured to implement the factory plan device.

DESCRIPTION OF EMBODIMENTS

Hereinafter, each embodiment of the present invention will be described with reference to the drawings. In principle, the same members are denoted by the same reference numerals in all the drawings for describing each embodiment, and repeated description thereof will be omitted. In addition, in the following embodiments, it goes without saying that a component (including an element step or the like) is not necessarily essential unless otherwise specified or clearly considered essential in principle. Further, when "formed of A", "formed by A", "having A", and "including A" are described, it goes without saying that other elements are not excluded except when it is specified that only the element is included. Similarly, in the following embodiments, when a shape, a positional relationship, and the like of a component are described, the embodiments shall include those which are substantially similar to the shape or the like of the component unless otherwise explicitly stated or clearly considered to be otherwise in principle.

First Embodiment

FIG. 1 is a diagram showing an example of a schematic configuration of a factory plan system according to an embodiment. As shown in the drawing, the factory plan system is formed of a factory plan device 1000 and an external device 2000. Further, the factory plan device 1000 and the external device 2000 are connected to each other via a network N, thereby making it possible to communicate with each other. Here, the network N is, for example, a public network such as the Internet, a Local Area Network (LAN), or a Wide Area Network (WAN).

The factory plan device 1000 is a device configured to make a factory plan. As shown in the drawing, the factory plan device 1000 includes a calculation unit 1100, a storage unit 1200, an input unit 1300, an output unit 1400, and a communication unit 1500.

The calculation unit 1100 is a functional unit configured to perform various processing executed by the factory plan device 1000. Specifically, the calculation unit 1100 includes a process labeling unit 1101, a resource candidate specification unit 1102, a working time calculation unit 1103, a process plan unit 1104, a resource layout calculation unit 1105, a production plan calculation unit 1106, and a factory planning unit 1107.

The process labeling unit 1101 is a functional unit configured to allocate a process ID of a work process to each component forming a target product. Specifically, the process labeling unit 1101 allocates the process ID to each component based on performance of the same component that has been handled before or a similar component according to a predetermined standard (hereinafter, the component may be referred to as a "past performance component"). Details of process labeling processing by the process labeling unit 1101 will be described later.

The resource candidate specification unit 1102 is a functional unit configured to specify a candidate for a production resource to be used in each process. Here, the production resource is, for example, facility equipment configured to perform manufacturing work in each process, such as assembly work of components in manufacturing a product. The resource candidate specification unit 1102 specifies a resource candidate for each process based on performance relating to a process identified by a process ID and the same production resource that has been allocated before to a past performance component associated with the process or a production resource similar thereto according to a predetermined standard (hereinafter, the production resource may be referred to as a "past performance resource"). Details of resource candidate specification processing by the resource candidate specification unit 1102 will be described later.

The working time calculation unit 1103 is a functional unit configured to calculate the working time of each process. Specifically, the working time calculation unit 1103 generates model information by machine learning using the performance of working time in a set of the past performance component and the past performance resource. Further, the working time calculation unit 1103 uses the generated model information to calculate predicted working time in accordance with a shape of a component of a target product and a resource candidate corresponding thereto. Details of working time calculation processing by the working time calculation unit 1103 will be described later.

The process plan unit 1104 is a functional unit configured to generate a process plan candidate. Specifically, the process plan unit 1104 generates a plurality of process plan candidates associated with the process order and the resource candidates for each product. Additionally, the process plan unit 1104 also generates a set of round-robin process plan candidates by combining a plurality of process plan candidates with all target products.

The resource layout calculation unit 1105 is a functional unit configured to calculate a resource layout which is an arrangement of production resources. Specifically, the resource layout calculation unit 1105 calculates a layout of a production resource configured to implement each process for each process plan candidate.

The production plan calculation unit 1106 is a functional unit configured to calculate a production plan. Specifically, the production plan calculation unit 1106 calculates a production plan in which working date and time are allocated for each process plan candidate so as to satisfy the monthly production volume of each product.

The factory planning unit 1107 is a functional unit configured to make a factory plan. Specifically, the factory planning unit 1107 specifies a production plan configured to maximize a productivity index from among the calculated production plans. In addition, the factory planning unit 1107 specifies a process plan and a layout of production resources corresponding to the specified production plan, and uses the process plan and the layout thereof as a factory plan. Details of factory planning processing by the factory planning unit 1107 will be described later.

The storage unit 1200 is a functional unit configured to store various types of data. Specifically, the storage unit 1200 stores production performance data 1201, product shape data 1202, component shape data 1203, production volume data 1204, factory layout data 1205, production resource candidate specification data A 1206, production resource candidate specification data B 1207, and production resource candidate specification data C 1208.

FIG. 2 is a diagram showing an example of the production performance data 1201. The production performance data 1201 is data relating to production performance in the past. Specifically, the production performance data 1201 includes a record in which a product ID 1201*a*, a component ID 1201*b*, a process ID 1201*c*, a production resource ID 1201*d*, a date and time 1201*e*, a start time 1201*f*, and an end time 1201*g* are associated with each other.

The product ID 1201*a* is identification information of a product. The component ID 1201*b* is identification information of a component. The process ID 1201*c* is identification information of a process. The production resource ID 1201*d* is identification information of a production resource. The date and time 1201*e* is, for example, information indicating execution date and time of a predetermined process such as assembling components of the corresponding component ID 1201*b* in the production of a product identified by the associated product ID 1201*a*. The start time 1201*f* is information indicating start time of a process identified by the associated process ID 1201*c*. The end time 1201*g* is information indicating end time of the process.

When the process specified by the process ID 1201*c* is completed for a target specified by the product ID 1201*a* and component ID 1201*b*, the production performance data 1201 is updated by registering information on the target.

FIG. 3 is a diagram showing an example of the product shape data 1202. The product shape data 1202 is design data of a product, and is three-dimensional shape data of a product identified by a product ID.

FIG. 4 is a diagram showing an example of the component shape data 1203. The component shape data 1203 is included in design data of a product and is data relating to a shape of a component forming a product. Specifically, the component shape data 1203 includes a record in which a component ID 1203*a*, a component name 1203*b*, a shape characteristic 1203*c*, a width 1203*d*, a length 1203*e*, a diameter 1203*f*, and a weight 1203*g* are associated with each other.

The component ID 1203*a* is identification information of a component. The component name 1203*b* is information indicating a name of a component. The shape characteristic 1203*c* is information indicating a shape characteristic of a component, such as a cylindrical shape, a rectangular shape, or a columnar shape. The width 1203*d*, the length 1203*e*, the diameter 1203*f*, and the weight 1203*g* are pieces of information indicating a width, a length, a diameter, and a weight of a component, respectively.

FIG. 5 is a diagram showing an example of the production volume data 1204. The production volume data 1204 is data relating to production volume (quantity) of a target product. Specifically, the production volume data 1204 includes a record in which a product ID 1204*a* and monthly production volume 1204*b* are associated with each other.

The product ID 1204*a* is identification information of a product. The monthly production volume 1204*b* is information indicating yearly and monthly production volume of a product identified by the associated product ID 1204*a*.

FIG. 6 is a diagram showing an example of the factory layout data 1205. The factory layout data 1205 is information indicating an area in which production resources can be disposed in a factory.

FIG. 7 is a diagram showing an example of the production resource candidate specification data A 1206. The production resource candidate specification data A 1206 is data relating to a type of production resource. Specifically, the production resource candidate specification data A 1206 includes a record in which a production resource type ID 1206*a* and a production resource type name 1206*b* are associated with each other.

The production resource type ID 1206*a* is information configured to identify the type of production resource. The production resource type name 1206*b* is information indicating the name of the type of production resource.

FIG. 8 is a diagram showing an example of the production resource candidate specification data B 1207. The production resource candidate specification data B 1207 is data relating to specifications of a production resource. Specifically, the production resource candidate specification data B 1207 includes a record in which a production resource type ID 1207*a*, a production resource ID 1207*b*, the number of axes 1207*c*, a weight 1207*d*, accuracy 1207*e*, a weight capacity 1207*f*, an arm length 1207*g*, and a speed 1207*h* are associated with each other.

The production resource type ID 1207*a* is information configured to identify a type of production resource. The production resource ID 1207*b* is identification information of a production resource. The number of axes 1207*c*, the weight 1207*d*, the accuracy 1207*e*, the weight capacity 1207*f*, the arm length 1207*g*, and the speed 1207*h* are pieces of information respectively indicating the number of axes, a weight, machining accuracy, a weight capacity, an arm length, and an operation speed of a production resource.

FIG. 9 is a diagram showing an example of production resource candidate specification data C 1208. The production resource candidate specification data C 1208 is three-dimensional shape data of a production resource identified by the production resource ID.

The input unit 1300 is a functional unit configured to receive an instruction and an input of information from an operator via the input device 105 provided in the factory plan device 1000.

The output unit 1400 is a functional unit configured to generate display information and output the display information to a display device provided in the factory plan device 1000.

The communication unit 1500 is a functional unit configured to perform information communication with the external device 2000. The external device 2000 is communicably connected to the factory plan device 1000 via the network N, and is, for example, a device capable of displaying predetermined information such as a factory plan made by the factory plan device 1000 (the factory plan including a production plan, a process plan, and a layout of production resources). The communication unit 1500 transmits data representing the factory plan made by the factory plan device 1000 to the external device 2000. The communication unit 1500 also acquires an instruction and input information from an operator who operates the external device 2000 from the external device 2000 via the network N.

An example of a schematic configuration (a functional configuration) of the factory plan device 1000 is described above.

Description of Operation

Next, the factory planning processing executed by the factory plan device 1000 will be described.

FIG. 10 is a flowchart showing an example of the factory planning processing. The processing is started, for example, when an instruction to execute the factory planning processing is received from an operator of the factory plan device 1000 via the input unit 1300.

When the processing is started, the process labeling unit 1101 acquires various data to be used for the processing from the storage unit 1200 (step S010). Specifically, the process labeling unit 1101 acquires, from the storage unit 1200, the production performance data 1201, the product shape data 1202, the component shape data 1203, the production volume data 1204, the factory layout data 1205, the production resource candidate specification data A 1206, the production resource candidate specification data B 1207, and the production resource candidate specification data C 1208.

Next, the process labeling unit 1101 performs the process labeling processing in which a process ID is allocated to each component of a target product based on performance of a past performance component (step S020).

FIG. 11 is a flowchart showing an example of the process labeling processing. When this processing is started, the process labeling unit 1101 acquires the product shape data 1202 of all the target products to be used to make a factory plan (step S021), and performs triangular meshing (polygon meshing) on the product shape of the target product (step S022). Here, a known technique may be used for the triangular meshing using the three-dimensional shape data.

Next, the process labeling unit 1101 divides the target product into the components thereof (step S023). Specifically, the process labeling unit 1101 specifies characteristics of a connection relationship between the meshes, and specifies shape characteristics (for example, a cylindrical shape, a rectangular shape, or a columnar shape) and a size (a width, a length, a diameter, a weight, and the like) of a component forming a product based on the specified characteristics. Additionally, the process labeling unit 1101 divides the product into the components thereof based on the specified shape characteristics. As a method of specifying the shape characteristics and the like from the characteristics of the connection relationship between the meshes, for example, a technique described in JP-A-6216211 may be used.

Next, the process labeling unit 1101 allocates a process ID to each component (step S024). Specifically, the process labeling unit 1101 uses the component shape data 1203 to specify a component ID of a component having the same shape characteristic and size as those of a component of a target product or a component closest thereto (hereinafter, the component may be referred to as a "past performance component in a first standard"). Further, the process labeling unit 1101 uses the production performance data 1201 to specify a process ID associated with the specified component ID, and allocates the specified process ID as a process ID of a component of a target product.

Next, the process labeling unit 1101 determines whether or not the process IDs are allocated to all the components of all the target products (step S025). Upon determining that the allocation of the the process IDs is not completed (No in step S025), the process labeling unit 1101 returns the processing to step S024. On the other hand, upon determining that the allocation thereof is completed (Yes in step S025), the process labeling unit 1101 ends the processing of this flow.

When the above-described process labeling processing is executed, one process ID is associated with each component of the target product.

Referring back to FIG. 10, when the process labeling processing in step S020 ends, the resource candidate specification unit 1102 performs the resource candidate specification processing of specifying a production resource candidate for each process based on performance related to the process ID and the past performance resource (step S030).

FIG. 12 is a flowchart showing an example of the resource candidate specification processing. When the processing is started, the resource candidate specification unit 1102 acquires the process ID allocated to each component in all the target products (step S031). Further, the resource candidate specification unit 1102 specifies a past performance component associated with the acquired process ID. Specifically, the resource candidate specification unit 1102 uses the production performance data 1201 and the component shape data 1203 to specify a component ID of a component, wherein the component ID is associated with the acquired process ID, and the component has the same shape characteristic as that of the component of the target product and has a difference in size (for example, a difference in size such as a width, a length, a diameter of a cylinder, and the like) within a standard value (hereinafter, the component may be referred to as a "past performance component in a second standard").

Next, the resource candidate specification unit 1102 specifies a production resource ID of a past performance resource associated with the process ID and the past performance component in the second standard (step S032). Specifically, the resource candidate specification unit 1102 uses the production performance data 1201 to specify a production resource ID associated with the specified component ID. The resource candidate specification unit 1102 also uses the production resource candidate specification data A 1206 and the production resource candidate specification data B 1207 to specify a production resource ID of a production resource having the same production resource type ID and the same number of axes associated with the specified production resource ID, the production resource having a difference in weight or the like within a reference value (the past performance resource). The resource candidate specification unit 1102 also specifies a production resource associated with the specified production resource ID as a production resource candidate.

Next, the resource candidate specification unit 1102 determines whether or not corresponding production resource candidates are completely specified for all process IDs of all components in all target products (step S033). Then, upon determining that the corresponding production resource candidates are not completely specified yet (No in step S033), the resource candidate specification unit 1102 returns the processing to step S032 and repeats the same processing. On the other hand, upon determining that the corresponding production resource candidates are completely specified (Yes in step S033), the resource candidate specification unit 1102 ends this flow.

When such resource candidate specification processing is executed, a plurality of production resource candidates are specified for the process ID associated with each component of a target product.

Referring back to FIG. 10, when the resource candidate specification processing ends in step S030, the working time calculation unit 1103 performs the working time calculation processing of calculating predicted working time in accordance with the shape of the component of the target product and the corresponding resource candidate (step S040).

FIG. 13 is a flowchart showing an example of the working time calculation processing. When this processing is started, the working time calculation unit 1103 generates model information by machine learning using performance of working time in a set of the past performance component and the past performance resource (step S041). Specifically, the working time calculation unit 1103 uses the production performance data 1201 to specify a set including the past performance component associated with the same process ID as the process ID allocated to the component and the past performance resources in the second standard. Further, the working time calculation unit 1103 calculates working time in the specified set based on a difference between start time and end time associated with the specified set.

In addition, the working time calculation unit 1103 specifies information on the shape of the past performance component in the specified set (for example, a shape characteristic and a size) and information on the specifications of the past performance resource (for example, a shape and a weight), respectively, from the component shape data 1203, the production resource candidate specification data A 1206, the production resource candidate specification data B 1207, and the production resource candidate specification data C 1208. Additionally, the working time calculation unit 1103 uses the specified information as an input value, and generates model information using a predetermined machine learning method such as random forest.

Next, the working time calculation unit 1103 calculates predicted working time for a set including the process ID of the component of the target product and the production resource candidate (step S042). Specifically, with respect to the component of the target product, the working time calculation unit 1103 inputs, to the model information, information on the shape (for example, a shape characteristic and a size), the process ID allocated in step S020, information (for example, a shape, a weight, and the like) on the specifications of the production resource candidate specified in step S030, thereby calculating the predicted working time for the set including the process ID of the component and the production resource candidate.

Next, the working time calculation unit 1103 determines whether or not calculation of the predicted working time is completed for the set including all process IDs associated with all components of all target products and the production resource candidates (step S043). Then, upon determining that the calculation thereof is not completed (No in step S043), the working time calculation unit 1103 returns the processing to step S042, and repeats the same processing. On the other hand, upon determining that the calculation thereof is completed (Yes in step S043), the working time calculation unit 1103 ends the processing of this flow.

When such working time calculation processing is executed, the predicted working time of each component is calculated for each set including a process ID associated with each component of a target product and a production resource candidate associated therewith.

Referring back to FIG. 10, when the working time calculation processing ends in step S040, the process plan unit 1104, the resource layout calculation unit 1105, and the production plan calculation unit 1106 cooperate to perform simultaneous optimization processing of a process plan, a production plan, and a production resource layout (step S050).

FIG. 14 is a flowchart showing an example of the simultaneous optimization processing. When such processing is started, the process plan unit 1104 generates a plurality of process plan candidates for each target product (step S051). Specifically, the process plan unit 1104 uses a heuristic such as a greedy method to preferentially allocate a production resource candidate having shorter predicted working time to each process for each set of the process ID and the production resource candidate. The process plan unit 1104 also determines the process order of each process for each target product. As for the method of determining the process order, for example, a technique described in JP-A-5686538 may be used. In addition, the process plan unit 1104 generates a process plan candidate in which the process order and the production resource candidate are associated with each other for each target product. The process plan unit 1104 generates a plurality of process plan candidates in which the process orders or the production resource candidates are different from each other until a predetermined number of plans (for example, 10 plans) are reached.

The process plan unit 1104 also generates a set of process plan candidates obtained by combining a plurality of process plan candidates generated for each target product with all target products. Specifically, the process plan unit 1104 extracts any process plan candidate for each target product, and generates a set of process plan candidates so that all combination patterns in all target products are covered.

Next, the resource layout calculation unit 1105 calculates a layout candidate for a production resource (step S052). Specifically, the resource layout calculation unit 1105 calculates, for each set of process plan candidates, a layout candidate for a production resource (hereinafter, the same may be referred to as a "resource layout candidate") so that predetermined layout constraints are satisfied and a distribution flow line of a target product is minimized. More specifically, the resource layout calculation unit 1105 uses the factory layout data 1205 to specify an area in which the production resource can be disposed. Further, the resource layout calculation unit 1105 calculates the resource layout candidate based on the process order of each target product so that the total sum of distribution flow lines in the specified area is minimized. As a method of calculating the resource layout candidate, for example, a 2-opt method, which is a solution method of obtaining the shortest path of a traveling sales problem, may be used.

Next, the production plan calculation unit 1106 calculates a production plan (step S053). Specifically, the production plan calculation unit 1106 calculates, for each set of process plan candidates, a production plan so as to maximize a productivity index of a factory by using the corresponding resource layout candidate and the production volume data 1204. More specifically, the production plan calculation unit 1106 acquires one set of process plan candidates and a resource layout candidate associated therewith, and calculates a production plan in which working date and time are allocated to a set including a process included in each process plan candidate and the production resource candidate so as to satisfy the monthly production volume shown in the production volume data 1204.

Such a production plan uses, as an objective function, productivity indexes such as production throughput, a facility operation rate of a production resource candidate, and an on-time delivery rate of a target product, and puts the same to a mixed integer programming (MIP) problem configured to allocate a working time frame to a set of each process and a production resource candidate, thereby making it possible to calculate a production plan solution by applying the MIP solution method.

The production plan calculation unit 1106 executes such a method for all sets of process plan candidates and resource layout candidates corresponding thereto, thereby calculating a plurality of production plan candidates. Further, when the production plan calculation unit 1106 calculates the production plan candidate, the same ends the processing of this flow.

Referring back to FIG. 10, when the simultaneous optimization of the process plan, the production plan, and the production resource layout is completed in step S050, the factory planning unit 1107 performs processing of making a factory plan (step S060). Specifically, the factory planning unit 1107 specifies a production plan configured to maximize a productivity index among the plurality of calculated production plans. The factory planning unit 1107 also specifies a resource layout candidate corresponding to the specified production plan and each process plan candidate included in a set of process plan candidates corresponding to the production plan. Further, the factory planning unit 1107 sets the specified production plan, resource layout candidate, and process plan candidate as production plan data 1210, resource layout data 1211, and process plan data 1209, respectively, and uses the same to make a factory plan. The factory planning unit 1107 also generates display information configured to display these factory plans via the output unit 1400 and outputs the generated display information to an output device 106.

An operator uses the displayed factory plan and predetermined data in the storage unit 1200 such as the production performance data 1201 and the production volume data 1204 to obtain productivity indexes such as production throughput, a facility operation rate of a production resource candidate, and an on-time delivery rate of a target product, thereby determining whether or not it is necessary to revise the drafted factory plan.

FIG. 15 is a diagram showing an example of the process plan data 1209. As shown in the drawing, the process plan data 1209 includes a record in which a product ID 1209a, which is identification information of a target product, a process ID 1209b, which is identification information of a process, and a production resource ID 1209c, which is identification information of a production resource, are associated with each other. Here, the process order may be defined from the highest record to the lower record, or the process ID number may represent the process order.

FIG. 16 is a diagram showing an example of the production plan data 1210. As shown in the drawing, the production plan data 1210 has substantially the same data configuration as the production performance data 1201 in FIG. 2. Specifically, the production plan data 1210 includes a record in which a product ID 1210a, a component ID 1210b, a process ID 1210c, a production resource ID 1210d, a date and time 1210e, a scheduled start time 1210f, and a scheduled end time 1210g are associated with each other. The scheduled start time 1210f and the scheduled end time 1210g are information corresponding to the start time 1201f and the end time 1201g in the production performance data 1201, respectively.

FIG. 17 is a diagram showing an example of the resource layout data 1211. As shown in the drawing, the resource layout data 1211 has a production resource ID of each production resource registered therein, the production resource ID being disposed in an area in which layout of a production resource can be performed in the factory layout data 1205.

Referring back to FIG. 10, when the processing of making a factory plan ends in step S060, the input unit 1300 determines whether or not an approval operation with respect to the output factory plan is received from an operator (step S070). Specifically, the input unit 1300 determines whether or not the approval operation is received from the operator, for example, based on whether or not an approval button displayed on an output screen of the factory plan is selected (pressed). Upon determining that such an operation is received (Yes in step S070), the input unit 1300 ends the processing of this flow.

On the other hand, upon determining that the approval operation is not received (No in step S070), for example, upon receiving an instruction to correct the input data from the operator, the input unit 1300 shifts the processing to step S080.

In step S080, the input unit 1300 receives an input of correction data. For example, the input unit 1300 receives, from the operator, an input of correction data in which a value of a product shape of the product shape data 1202, a product ID of the production volume data 1204 and a value of the monthly production volume, a position of an area in which a production resource can be disposed in the factory layout data 1205, and values corresponding to various items of the production resource candidate specification data A 1206 to C 1208 are changed. Further, the input unit 1300 reflects the received correction data in the corresponding data. Additionally, when the reflection of the correction data is completed, the input unit 1300 returns the processing to step S010 and performs the same processing as described above.

The factory plan may be output and displayed on the external device 2000 being connected via the network N so as to be able to communicate with the factory plan device 1000. Further, the correction data received from the operator may be acquired from the external device 2000 via the communication unit 1500.

The factory plan device according to the embodiment is described above. According to such a factory plan device, it is possible to more efficiently make a factory plan configured to maximize a productivity index. Particularly, the factory plan device can simultaneously optimize a process plan, a production plan, and a resource layout.

Second Embodiment

FIG. 18 is a diagram showing an example of a schematic configuration of the factory plan device 1000 according to a second embodiment. When it is detected that divergence between a production plan and production performance is equal to or greater than a reference value, the factory plan device 1000 according to the embodiment calculates a factory plan when a resource layout is changed and a new factory plan when the current resource layout is maintained in addition to the current factory plan, and performs processing of making a factory plan configured to maximize a productivity index from among these factory plans.

As shown in the drawing, the calculation unit 1100 of the factory plan device 1000 according to the embodiment includes, in addition to each functional unit of the calculation unit 1100 in the factory plan device 1000 of the first embodiment, a divergence determination unit 1108 and a layout change cost calculation unit 1109. Further, the storage unit 1200 according to the embodiment includes, in addition to various information stored in the storage unit 1200 according to the first embodiment, the process plan data 1209, the production plan data 1210, and the resource layout data 1211. A functional unit configured to perform the same processing as in the first embodiment and data having the same content as in the first embodiment are denoted by the same reference numerals, and a detailed description thereof will be omitted.

The divergence determination unit 1108 is a functional unit configured to determine divergence between a plan and performance. Specifically, the divergence determination unit 1108 compares the production plan data 1210, which is a future plan, with the production performance data 1201 in which the performance is registered, and determines a degree of divergence based on a difference between the plan and the performance.

The layout change cost calculation unit 1109 is a functional unit configured to calculate cost incurred when a resource layout is changed. The cost is a monetary cost or a time cost.

The process plan data 1209, the production plan data 1210, and the resource layout data 1211 are data calculated in the factory planning processing in the first embodiment, and each data configuration is shown in FIGS. 15 to 17.

FIG. 19 is a flowchart showing an example of the factory planning processing. In the embodiment, processing different from that of the first embodiment will be mainly described, and a detailed description of the processing having the same contents will be omitted.

When the processing is started, the process labeling unit 1101 acquires various data to be used for the processing from the storage unit 1200 (step S100). Specifically, the process labeling unit 1101 acquires, from the storage unit 1200, the production performance data 1201, the product shape data 1202, the component shape data 1203, the production volume data 1204, the factory layout data 1205, the production resource candidate specification data A 1206, the production resource candidate specification data B 1207, the production resource candidate specification data C 1208, the process plan data 1209, the production plan data 1210, and the resource layout data 1211.

Next, the divergence determination unit 1108 determines whether or not divergence between a plan and performance is equal to or greater than a reference value (step S110). Specifically, the divergence determination unit 1108 compares the production plan data 1210 and the production performance data 1201, and determines a degree of divergence based on a difference between the plan and the performance. Upon determining that the degree of divergence is not equal to or greater than the reference value (No in step S110), the divergence determination unit 1108 ends the processing of this flow. On the other hand, upon determining that the same is equal to or greater than the reference value (Yes in step S110), the divergence determination unit 1108 performs the process labeling processing (step S120), the resource candidate specification processing (step S130), and the working time calculation processing (step S140). Since these pieces of processing are the same as the corresponding processing in the first embodiment, a description thereof will be omitted.

Next, the process plan unit 1104, the resource layout calculation unit 1105, and the production plan calculation unit 1106 cooperate to perform simultaneous re-planning processing of a process plan, a production plan, and a production resource layout (step S150).

FIG. 20 is a flowchart showing an example of the simultaneous re-planning processing. After this processing is started, the process plan unit 1104 generates a plurality of process plan candidates for each target product by the same processing as in step S051 in the first embodiment (step S151).

Further, the resource layout calculation unit 1105 calculates a layout candidate for a production resource by the same processing as in step S052 in the first embodiment (step S152).

Next, the layout change cost calculation unit 1109 calculates layout change cost for the layout candidate for the production resource calculated in step S152 (step S153). Specifically, the layout change cost calculation unit 1109 calculates the cost when the current resource layout is changed to the layout candidate corresponding to each process plan candidate calculated in step S152. Such cost is calculated based on monetary cost and time cost such as lead time and working cost occurring when a device such as a production resource is moved. For various costs, for example, a cost table in which a cost type and a cost value are associated with each other may be used.

The layout change cost calculation unit 1109 temporarily stores, in the storage unit 1200, the layout change cost calculated in step S153 in association with the process plan candidate generated in step S151 and the layout candidate calculated in step S152.

Through the processing in steps S151 to S153, a plurality of process plan candidates configured to change a layout of a production resource, that is, a plurality of process plan candidates requiring layout change cost are generated.

Next, the process plan unit 1104 maintains (fixes) the current resource layout and generates a plurality of new process plan candidates (step S154). Specifically, the process plan unit 1104 is limited to a production resource existing in the current resource layout, that is, a production resource of the process plan candidate (the process plan data 1209) included in the current factory plan, and generates a plurality of process plan candidates by the same processing as in the first embodiment. Further, the process plan unit 1104 also associates the current resource layout with each of the generated process plan candidates.

Through the processing in step S154, a plurality of process plan candidates that do not change a layout of a production resource, that is, a plurality of process plan candidates that do not require layout change cost are generated.

Next, the production plan calculation unit 1106 uses the current resource layout and the production volume data 1204 to calculate a production plan for each set of process plan candidates in all the target products generated in the current process plan and step S154 by the same processing as in step S053 in the first embodiment (step S155). That is, in step S155, the production plan based on the process plan candidates that do not require the layout change cost is calculated.

Next, the production plan calculation unit 1106 uses the layout candidate of the production resource calculated in step S152, the layout change cost, and the production volume data 1204 to calculate a production plan for each set of process plan candidates in all target products generated in step S151 by the same processing as in step S053 in the first embodiment (step S156). Specifically, the production plan calculation unit 1106 calculates the production plan based on the process plan candidate that requires layout change cost so as to maximize a productivity index of a factory and minimize the layout change cost. Further, when the production plan calculation unit 1106 calculates the production plan, the same ends the processing of this flow.

Referring back to FIG. 19, when the simultaneous re-planning processing in step S150 ends, the factory planning unit 1107 performs processing of making a factory plan (step S160). Specifically, the factory planning unit 1107 specifies a production plan configured to maximize a productivity index among the plurality of calculated production plans, a resource layout candidate corresponding thereto, and a process plan candidate corresponding to the production plan by the same processing as in step S060 in the first embodiment with respect to each of the production plan candidate causing a layout change of a production resource and the production plan candidate without a layout change of a production resource.

In addition, the factory planning unit 1107 respectively sets a production plan specified for each case of the production plan candidate causing the layout change of the production resource and the production plan candidate without the layout change of the production resource, a resource layout candidate corresponding thereto, and a process plan candidate as the production plan data 1210, the resource layout data 1211, and the process plan data 1209, and makes the same as a factory plan. In addition, the factory planning unit 1107 generates display information configured to display, via the output unit 1400, each of a factory plan causing a layout change of a production resource (hereinafter, the factory plan may be referred to as a "first factory plan") and a factory plan without a layout change of a production resource (hereinafter, the factory plan may be referred to as a "second factory plan"), and outputs the generated display information to the output device 106.

Further, an operator obtains productivity indexes such as production throughput, a facility operation rate of a production resource candidate, and an on-time delivery rate of a target product for each of the displayed first factory plan and second factory plan, and determines whether or not the drafted factory plan needs to be corrected. These productivity indexes can be obtained using each of the output factory plans and various data in the storage unit 1200 (for example, the production performance data 1201 and the production volume data 1204).

Next, the input unit 1300 determines whether or not an approval operation for each of the output factory plans is received from an operator (step S170). Upon determining that the approval operation is received (Yes in step S170), the input unit 1300 shifts the processing to step S180. On the other hand, upon determining that the approval operation is not received (No in step S170), for example, when an instruction to correct input data is received from the operator, the input unit 1300 shifts the processing to step S190. In addition, in step S190, the input unit 1300 receives an input of correction data by the same processing as in step S080 in the first embodiment. Further, the input unit 1300 reflects the received correction data in the corresponding data. Further, when the reflection of the correction data is completed, the input unit 1300 returns the processing to step S100 and performs the same processing as described above.

Additionally, in step S180, the input unit 1300 receives selection of one of the first factory plan and the second factory plan. Further, when the input unit 1300 receives the selection of the factory plan, the same ends the processing of this flow.

Each factory plan may be output and displayed on the external device 2000 being connected via the network N so as to be able to communicate with the factory plan device 1000. Further, the correction data received from the operator may be obtained from the external device 2000 via the communication unit 1500.

The factory plan device according to the second embodiment is described above. According to the factory plan device 1000, it is possible to more efficiently make a factory plan configured to maximize a productivity index. Particularly, the factory plan device can calculate a production plan configured to maximize a productivity index and minimize change cost when calculating a production plan causing a layout change of a production resource. In addition, since the factory plan device can provide both a factory plan causing a layout change of a production resource and a factory plan without a layout change of a production resource, a user can select a more efficient factory plan.

FIG. 21 is a diagram showing an example of a hardware configuration of a computer configured to implement the factory plan device 1000. As shown in the drawing, the factory plan device 1000 includes a calculation device 101, a memory 102, an external storage device 103, a storage medium drive device 104, an input device 105, an output device 106, and a communication device 107.

The calculation device 101 is, for example, a Central Processing Unit (CPU). The memory 102 is a volatile or non-volatile memory 102 such as a Random Access Memory (RAM) or a Read Only Memory (ROM). The external storage device 103 is, for example, a Hard Disk Drive (HDD) or a Solid State Drive (SSD). The storage medium drive device 104 is, for example, a device capable of reading and writing information from and to, for example, a CD (Compact Disk: registered trademark), a DVD (Digital Versatile Disk: registered trademark), or any other portable storage medium 108.

The input device 105 is, for example, a keyboard, a mouse, a microphone, or the like. The output device 106 is, for example, a display device or a printer. The communication device 107 is, for example, a Network Interface Card (NIC) to be connected to the network N.

An example of a hardware configuration of the factory plan device 1000 is described above.

The calculation unit 1100 of the factory plan device 1000 is implemented by a program configured to cause the calculation device 101 to perform processing. This program is stored in the memory 102 or the external storage device 103, loaded on the memory 102 when the program is executed, and executed by the calculation device 101. Further, the storage unit 1200 is implemented by the memory 102 or the external storage device 103 or a combination thereof. Additionally, the input unit 1300 is implemented by the input device 105. In addition, the output unit 1400 is implemented by the output device 106. Furthermore, the communication unit 1500 is implemented by the communication device 107.

Further, the respective configurations, functions, processing units, processing means, and the like of the factory plan device 1000 may be implemented by hardware, for example, by designing a part or all of them with an integrated circuit. Moreover, the respective configurations and functions may be implemented by software by allowing a processor to interpret and execute a program configured to implement each of the functions. Information such as a program, a table, and a file configured to implement each function can be stored in a storage device such as the memory 102, a hard disk, and an SSD, or a recording medium such as an IC card, an SD card, and a DVD.

Further, the present invention is not limited to the above-described embodiments and modifications, and includes various modifications within the scope of the same technical idea. For example, the above-described embodiments have been described in detail in order to explain the present invention in an easy-to-understand manner, and are not necessarily limited to those having all the described configurations. In addition, it is possible to replace a part of the configuration of one embodiment with the configuration of another embodiment, and it is also possible to add the configuration of another embodiment to the configuration of one embodiment. Moreover, other configurations can be added, deleted, and replaced with respect to a part of the configuration of each embodiment.

Further, a control line and an information line indicate what is considered necessary for description, and do not necessarily indicate all control lines and information lines on the product. In fact, it may be considered that almost all the configurations are connected to each other.

REFERENCE SIGNS LIST

1000: factory plan device
1100: calculation unit
1101: process labeling unit
1102: resource candidate specification unit
1103: working time calculation unit
1104: process plan unit 1105: resource layout calculation unit
1106: production plan calculation unit
1107: factory planning unit
1108: divergence determination unit
1109: layout change cost calculation unit
1200: storage unit
1201: production performance data
1202: product shape data
1203: component shape data
1204: production volume data
1205: factory layout data
1206: production resource candidate specification data A
1207: production resource candidate specification data B
1208: production resource candidate specification data C
1209: process plan data
1210: production plan data
1211: resource layout data
1300: input unit
1400: output unit
1500: communication unit
2000: external device
N: network
101: calculation device
102: memory
103: external storage device
104: storage medium drive device
105: input device
106: output device
107: communication device
108: portable storage medium

The invention claimed is:

1. A factory plan device comprising:
a calculation unit;
one or more factory production machines;
a non-transitory computer-readable storage medium storing instructions, wherein
the calculation unit is operatively coupled to the one or more factory production machines,
the calculation unit is configured to execute the instructions and specify a process and a production resource candidate based on a shape of a component of a target product by inputting past production performance data of a product, production volume data, design data of the product, specification data of a production resource, and layout data of a factory,
the calculation unit is further configured to generate machine-executable production instructions that control the one or more factory production machines, and wherein the calculation unit calculates:
(a) a process plan configured to determine an order of the process and the production resource,
(b) a production plan configured to determine working date and time of the production resource, and
(c) a layout of the production resource constrained by a physical factory floor layout and resources positioning limitations, so as to maximize a predetermined productivity index in the factory.

2. The factory plan device according to claim 1, wherein the calculation unit
generates a process plan candidate including the order of the process and the production resource for each of the components of the target product,
calculates a layout candidate for the production resource for each combination of the process plan candidates in a plurality of the target products,
calculates a production plan in which execution date and time of the process is allocated so as to maximize the productivity index for each combination of the process plan candidates, wherein the production plan is calculated using the layout candidate for the production resource and the production volume data corresponding to the target product, wherein the layout candidate reflects physical positioning constraints of factory production machines, and
makes a factory plan including the production plan, the process plan corresponding to the production plan, and the layout of the production resource, wherein the production plan includes machine executable instructions.

3. The factory plan device according to claim 2, wherein the calculation unit generates the process plan candidate configured to allocate the order of the process and the production resource having the minimum working time to each of the components of the target product by using the production performance data including a process of a component of a product produced in the past, the production resource executing the process, and working time of the process, wherein the working time reflects actual execution time on physical factory equipment.

4. The factory plan device according to claim 3, wherein the calculation unit
generates model information by machine learning using a shape of the component, the production resource, and the working time included in the production performance data,
calculates predicted working time of the component of the target product by inputting the shape of the component of the target product to the model information, and
allocates the production resource having the minimum predicted working time to the process plan candidate, wherein the allocated production resource comprises a programmable factory machine.

5. The factory plan device according to claim 2, wherein the calculation unit generates a plurality of the process plan candidates for each target product, and generates a set of the process plan candidates obtained by combining the process plan candidates with all the target products, wherein each process plan candidate includes control instructions for physical factory equipment.

6. The factory plan device according to claim 5, wherein the calculation unit associates the layout candidate for the production resource with each set of the process plan candidates, wherein the layout candidate reflects spatial constraints of the physical factory floor and resource positioning feasibility.

7. The factory plan device according to claim 6, wherein the calculation unit makes a factory plan including the production plan, the process plan candidate included in the set of the process plan candidates used to calculate the production plan, and the layout candidate for the production resource associated with the process plan candidate, wherein the factory plan comprises instructions for scheduling and positioning physical factory resources.

8. The factory plan device according to claim 2, wherein the calculation unit calculates the production plan so as to satisfy production volume for each period shown in the production volume data, wherein the production plan allocates working date and time for the process to a combination of the process and the production resource included in the process plan candidate, wherein the working date and time define machine level task schedules executable by production equipment.

9. The factory plan device according to claim 2, wherein the calculation unit generates a first process plan candidate accompanied by the layout candidate for the production resource and a second process plan candidate configured not to change the layout candidate for the production resource when divergence between a plan indicated by the production plan and performance indicated by the past performance data of the product is equal to or greater than a reference value, wherein the divergence reflects deviations in machine throughput or equipment configuration, and calculates the production plan based on each of the first process plan candidate and the second process plan candidate.

10. The factory plan device according to claim 9, wherein the calculation unit calculates the production plan using the first process plan candidate so as to minimize cost of changing the layout candidate for the production resource, wherein the cost is based on physical relocation of factory machinery or reconfiguration of production lines.

11. A factory plan system comprising:
a factory plan device;
one or more programmable factory production machines; and
an external device,
  wherein the factory plan device includes:
    a calculation unit operatively connected to the one or more programmable factory production machines and configured to specify a process and a production resource candidate based on a shape of a component of a target product by inputting past production performance data of a product, production volume data, design data of the product, specification data of a production resource, and layout data of a factory,
  wherein the calculation unit calculates a process plan configured to determine order of the process and the production resource, a production plan configured to determine working date and time of the production resource, and a layout configured to dispose the production resource based on physical factory constraints so as to maximize a predetermined productivity index in the factory; and
  a communication unit configured to transmit predetermined display information including the production plan and machine level control data to the external device, and
wherein the external device displays the display information acquired from the factory plan device and provides the machine level control data to a factory control system.

12. A factory plan method performed by a computer, wherein the computer performs a calculation step comprising:
specifying a process and a production resource candidate based on a shape of a component of a target product by inputting past production performance data of a product, production volume data, design data of the product, specification data of a production resource, and layout data of a factory; and
calculating: (a) a process plan configured to determine order of the process and the production resource, (b) a production plan configured to determine working date and time of the production resource, and (c) a layout of the production resource, wherein the process plan and production plan are converted into control command for factory equipment, and wherein the layout is calculated based on actual spatial constraints of physical factory equipment, so as to maximize a predetermined productivity index in a factory.

* * * * *